United States Patent
Gallagher

(10) Patent No.: US 10,019,566 B1
(45) Date of Patent: Jul. 10, 2018

(54) AUTHORIZING ROBOT USE AND/OR ADAPTING PHYSICAL CONTROL PARAMETERS FOR A ROBOT

(71) Applicant: X Development LLC, Mountain View, CA (US)

(72) Inventor: Garratt Gallagher, Oakland, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 82 days.

(21) Appl. No.: 15/099,203

(22) Filed: Apr. 14, 2016

(51) Int. Cl.
*G06F 12/14* (2006.01)
*G06F 21/44* (2013.01)
*G06N 99/00* (2010.01)

(52) U.S. Cl.
CPC ........... *G06F 21/44* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 8,046,104 B2 | 10/2011 | Sjoberg | |
| 8,818,556 B2 | 8/2014 | Sanchez et al. | |
| 9,128,476 B2 | 9/2015 | Jung et al. | |
| 2008/0134801 A1 | 6/2008 | Tseng et al. | |
| 2013/0343640 A1* | 12/2013 | Buehler | B25J 9/0087 382/155 |
| 2015/0073598 A1* | 3/2015 | Rosenstein | B25J 5/007 700/264 |
| 2015/0278577 A1 | 10/2015 | Cho et al. | |
| 2016/0031081 A1* | 2/2016 | Johnson | B25J 9/1656 700/250 |
| 2016/0291697 A1* | 10/2016 | Jules | G06F 21/31 |

OTHER PUBLICATIONS

De Santis et al. "An Atlas of Physical Human-Robot Interaction." Mechanism and Machine Theory 43, No. 3 (2008): 253-270.
Argall et al. "A Survey of Tactile Human-Robot Interactions." Robotics and Autonomous Systems 58, No. 10 (2010): 1159-1176.

* cited by examiner

*Primary Examiner* — Brandon S Hoffman
(74) *Attorney, Agent, or Firm* — Middleton Reutlinger

(57) ABSTRACT

Some aspects are related to methods and apparatus that enable authorization of one or more functionalities of a robot based on a user physically manipulating the robot. For example, an authorization for a robot may include one or more authorization parameters associated with physical manipulation of the robot and sensor data generated in response to physical manipulation of the robot by a user may be utilized to determine if the physical manipulation conforms to the authorization parameters. If conformance is determined, one or more functionalities of the robot may be activated. Some implementations additionally and/or alternatively relate to methods and apparatus for adapting one or more physical control parameters for a robot based on preferences of a user of the robot, such as a user that is currently authorized for the robot.

19 Claims, 12 Drawing Sheets

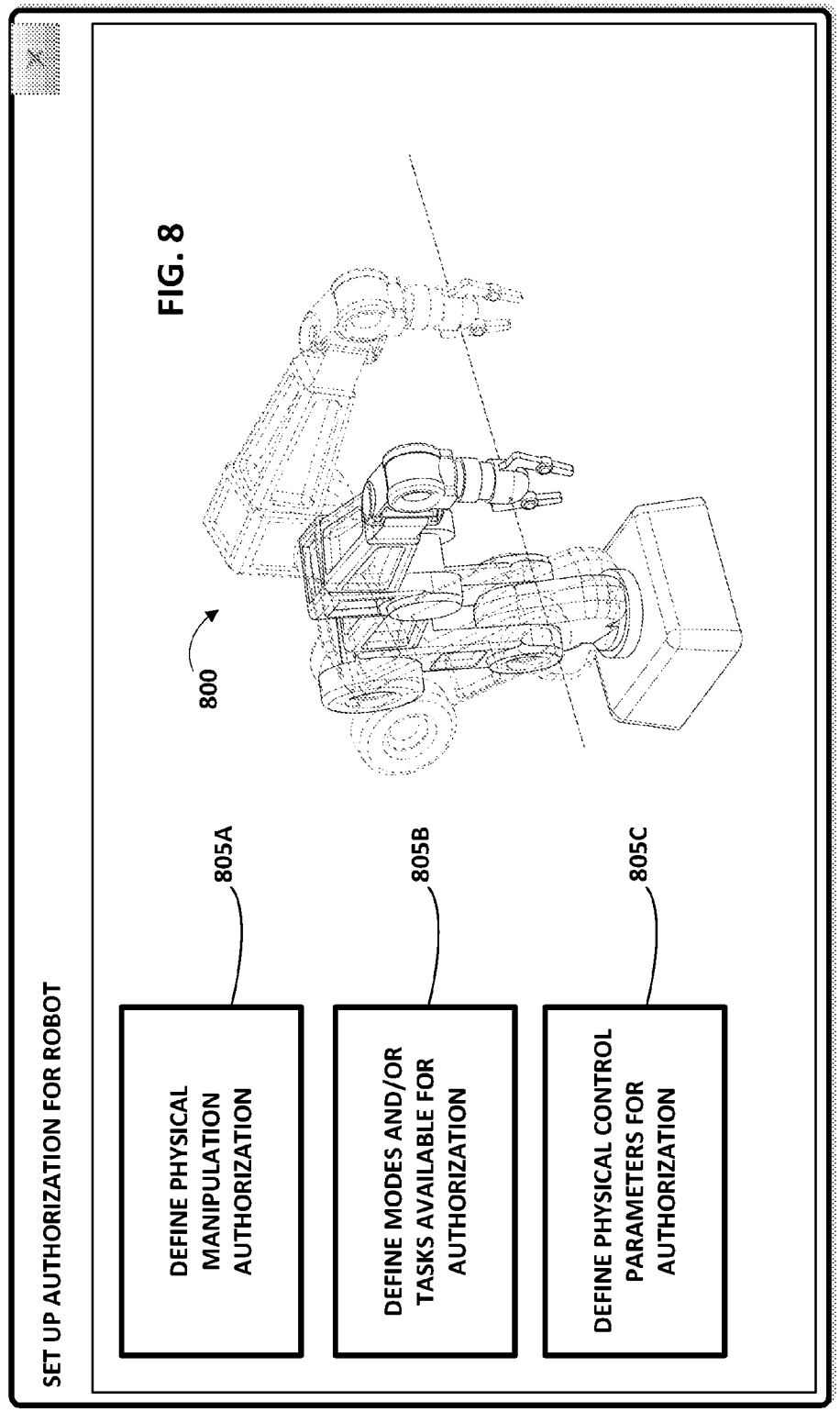

AUTHORIZING ROBOT USE AND/OR ADAPTING PHYSICAL CONTROL PARAMETERS FOR A ROBOT

BACKGROUND

Some robots are restricted to control and/or modification by authorized users. For example, some industrial robots may be modified only by authorized users who provide their authorization via a separate computing device in communication with the industrial robot. Also, for instance, some robots may be activated in response to authorization of a user via a fingerprint sensor. However, these and/or other techniques may suffer from one or more drawbacks. For example, some techniques may not enable a user to be authorized for one or more functionalities of a robot based on the user physically contacting and/or physically manipulating the robot.

Separately, some robots may enable physical manipulation of one or more components of the robot by a human. For example, some robots may enable a user to physically manipulate the robot during a "training mode" of the robot, to enable the robot to learn a path and/or one or more aspects of a task based on the physical manipulation. However, these and/or other techniques may suffer from one or more drawbacks. For example, robots that enable physical manipulation of the robot may not adapt one or more physical control parameters for a robot based on preferences of a user, such as preferences associated with an authorized user and/or preferences dictated by an active user providing commands via one or more user interface input devices associated with the robot.

Additional and/or alternative drawbacks of these and/or other techniques may be presented.

SUMMARY

Some implementations of the present disclosure are generally directed to methods and apparatus that enable authorization of one or more (e.g., all) functionalities of a robot based on a user physically manipulating the robot. For example, an authorization for a robot may include one or more authorization parameters associated with physical manipulation of the robot such as: one or more authorization positions for one or more components of the robot; one or more authorization orientations for one or more components of the robot; one or more authorization velocities for one or more components of the robot; and/or one or more authorization accelerations for one or more components of the robot. For instance, authorization positions of a robot authorization may define a plurality of end effector reference point positions for an end effector of the robot, such as a plurality of positions that generally conform to a circle, followed by a plurality of positions that generally conform to a check mark. To "unlock" one or more functionalities of the robot, the user may physically manipulate an end effector of the robot in a circle, then manipulate the end effector along a path that conforms to a check mark. One or more processors of the robot may utilize sensor data from one or more sensors associated with operational components of the robot to determine if the positions of the user manipulations conform to the positions of the authorization positions and may unlock one or more functionalities of the robot based on conformance being determined. Soft matching and/or exact matching may be utilized to determine conformance.

Some implementations of the present disclosure additionally and/or alternatively relate to methods and apparatus for adapting one or more physical control parameters for a robot based on preferences of a user of the robot. In some of those implementations, the preferences may be identified based on the preferences being associated with a user that is currently authorized for the robot. The user may be authorized for the robot by physically manipulating the robot (e.g., as described above) and/or utilizing additional and/or alternative techniques (e.g., a fingerprint sensor associated with the robot). In some implementations, the preferences may additionally and/or alternatively be identified based on user input provided by the user via one or more user interface input devices associated with the robot.

The physical control parameters of a robot affect the response of one or more operational components (e.g., servo motors or other actuators) of the robot when the robot is physically manipulated by a user. Physical control parameters may include, for example, impedance of the robot, the "locking" of one or more degrees of freedom of the robot, restricting the freedom of movement of one or more reference points of the robot (e.g., a reference point of the end effector), etc. In some implementations, the physical control parameters affect the response of operational components of the robot at least during training of the robot, such as training via physical manipulation.

In some implementations, a method implemented by one or more processors associated with a robot may be provided that includes identifying sensor data generated by one or more sensors of the robot. The sensor data is generated when at least one function of the robot is inactive and the sensor data is generated in response to physical manipulation of the robot by a user that causes one or more components of the robot to traverse to a plurality of positions. The method further includes: comparing authorization parameters for an authorization of the robot to the sensor data or to values generated based on the sensor data; determining, based on the comparing, that the authorization parameters conform to the sensor data or to the values generated based on the sensor data; and activating the at least one function of the robot based on determining that the authorization parameters conform to the sensor data or to the values generated based on the sensor data.

This method and other implementations of technology disclosed herein may each optionally include one or more of the following features.

In some implementations the at least one function of the robot is a training mode of the robot.

In some implementations the at least one function of the robot includes at least one function that is particular to the user and the method further includes identifying that the authorization parameters are mapped to the at least one function in one or more computer readable media. Activating the at least one function of the robot may include activating the at least one function based on identifying the authorization parameters are mapped to the at least one function. In some versions of those implementations, identifying that the authorization parameters are mapped to the at least one function includes: identifying a first mapping between the authorization parameters and an identifier of the user; and identifying a second mapping between the identifier of the user and the at least one function. In some versions of the implementations where the at least one function is particular to the user, the at least one function is a mechanical impedance setting for at least some of the components of the robot.

In some implementations, the method further includes generating, based on the sensor data, manipulation position values that define positions traversed by the end effector in response to the physical manipulation of the robot by the user—and comparing the authorization parameters for the authorization of the robot to the sensor data or to the values generated based on the sensor data includes comparing position values to the manipulation position values. In some versions of those implementations, the sensor data includes position values for a plurality of joints of the robot that control positioning of the end effector and generating the manipulation position values includes applying the position values to a forward kinematic model of the robot to generate the manipulation position values.

In some implementations, the method further includes identifying an initiation of authorization of the robot and applying, based on identifying the initiation of authorization, manipulation constraints during the physical manipulation of the robot by the user. In some of versions of those implementations, the manipulation constraints restrict movement of a reference point of an end effector of the robot to one or more planar segments and/or to movements between a defined subset of positions.

In some implementations, identifying the sensor data further includes selecting the sensor data based on user interface input being received before or during generation of the sensor data.

In some implementations, a method implemented by one or more processors associated with a robot may be provided that includes: identifying an identifier of an active user of the robot based on interaction by the user with the robot and identifying one or more physical control parameters mapped to the identifier in one or more computer readable media. The physical control parameters affect the response of one or more operational components of the robot when the robot is physically manipulated by the user. The method further includes implementing the physical control parameters to affect the response of the operational components of the robot during physical manipulation of the robot by the user.

This method and other implementations of technology disclosed herein may each optionally include one or more of the following features.

In some implementations, the method further includes: receiving user interface input indicating additional physical control parameters that further affect the response of one or more of the operational components of the robot; and implementing the additional physical control parameters. In some of those implementations, the physical control parameters affect a mechanical impedance of the robot and/or the additional physical control parameters lock one or more degrees of freedom of the robot and/or restrict movement of an end effector of the robot along one or more axes.

In some implementations, identifying the identifier of the active user of the robot based on interaction by the user with the robot includes: identifying sensor data generated by one or more sensors of the robot in response to physical manipulation of the robot by the user; comparing authorization parameters for the user to the sensor data or to values generated based on the sensor data; and determining, based on the comparing, that the authorization parameters conform to the sensor data or to the values generated based on the sensor data. In those implementations, the identifier of the active user is the authorization parameters or is mapped to the authorization parameters and the identifier of the active user is identified based on determining that the authorization parameters conform to the sensor data or to the values generated based on the sensor data.

In some implementations, identifying the identifier of the active user of the robot based on interaction by the user with the robot includes: identifying sensor data generated by a fingerprint sensor of the robot in response to the user contacting the fingerprint sensor; comparing authorization parameters for the user to the sensor data or to values generated based on the sensor data; determining, based on the comparing, that the authorization parameters conform to the sensor data or to the values generated based on the sensor data. In those implementations, the identifier of the active user is the authorization parameters or is mapped to the authorization parameters and the identifier of the active user is identified based on determining that the authorization parameters conform to the sensor data or to the values generated based on the sensor data.

Other implementations may include one or more non-transitory computer readable storage media storing instructions executable by one or more processors to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 8 illustrates an example graphical user interface for use in defining authorization parameters for an authorization of a robot and/or for defining one or more functions of the robot for the authorization.

DETAILED DESCRIPTION

Figure 1:
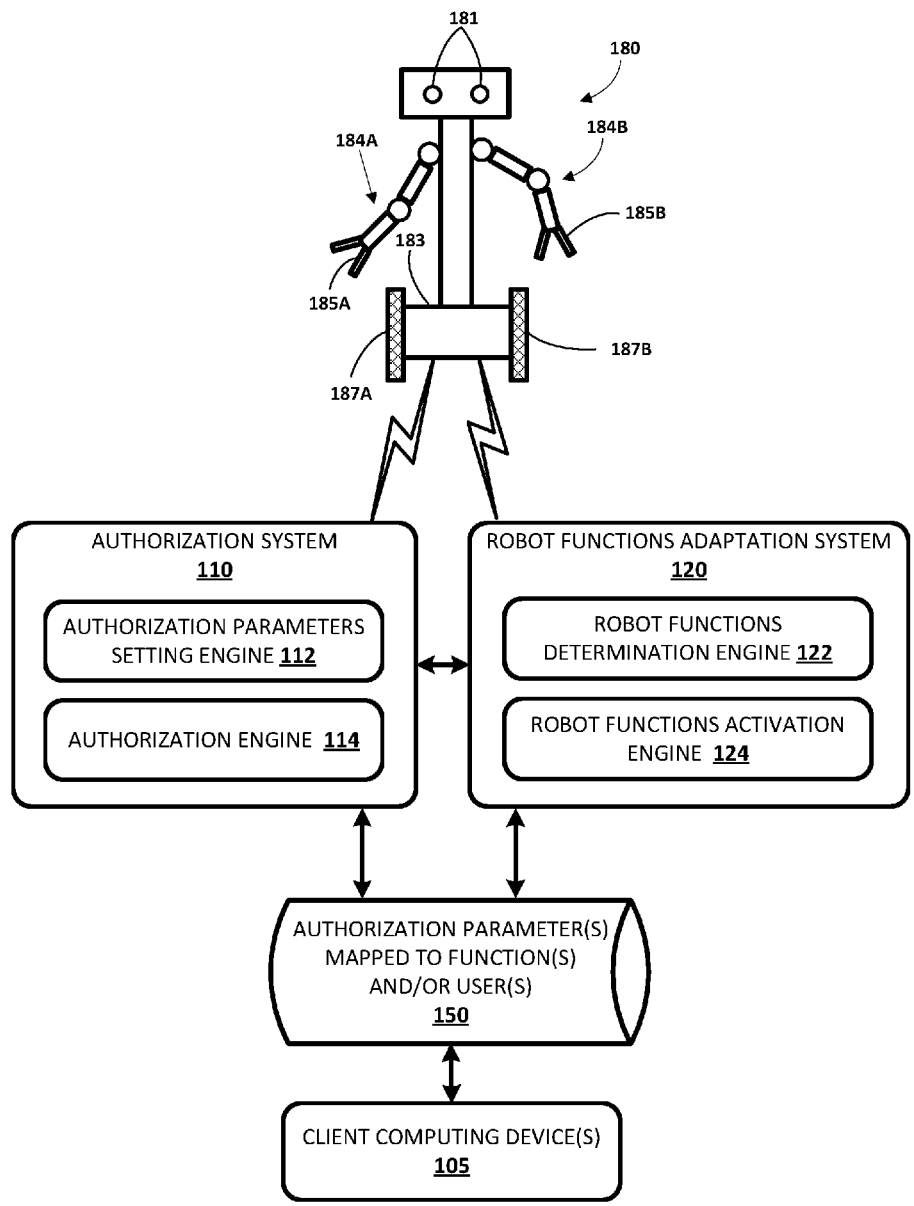
FIG. 1 illustrates an example environment in which one or more functionalities of a robot may be authorized based on a user physically manipulating the robot and/or in which one or more physical control parameters for the robot may be adapted based on preferences of a user.

FIG. 1 illustrates an example environment in which one or more functionalities of a robot may be authorized based on a user physically manipulating the robot and/or in which one or more physical control parameters for the robot may be adapted based on preferences of a user. The environment includes robot 180 that includes and/or is in network communication with authorization system 110 and with robot functions adaptation system 120. Also provided in the environment of FIG. 1 are one or more client computing devices 105 and a database 150 of authorization parameters mapped to function(s) and/or user(s). The client computing devices 105 may be a tablet, a desktop computer, a laptop computer, a smartphone, and/or other computing device and may, in some implementations, share one or more aspects with the example computer system 1310 of FIG. 13.

Database 150 includes one or more non-transitory computer readable storage media that store authorization parameters, identifiers of robot functions, identifiers of users, and/or other data and stores mappings (i.e., data defining an association) between the stored data. In some implementations, one or more (e.g., all) aspects of database 150 may be stored in one or more non-transitory computer readable storage media of the robot 180. In some implementations, one or more (e.g., all) aspects of database 150 may be stored in one or more non-transitory computer readable storage media that are separate from the robot 180 and the robot 180 may access the database 150 via a direct connection and/or via one or more networks such as a local area network and/or a wide area network (e.g., the Internet).

The robot 180 includes robot arms 184A and 184B with corresponding end effectors 185A and 185B, that each take the form of a gripper with two opposing "fingers" or "digits." The robot 180 also includes a base 183 with wheels 187A and 187B provided on opposed sides thereof for locomotion of the robot 180. The base 183 may include, for example, one or more motors for driving corresponding wheels 187A and 187B to achieve a desired direction, velocity, and/or acceleration of movement for the robot 180. Although specific end effectors 185A and 185B are illustrated, in other implementations robot 180 and/or other robot may include one or more additional or alternative end effectors. For example, other types of "grippers" may be utilized including, for example, other types of "impactive" grippers (e.g., a mechanical hand), "ingressive" grippers (e.g., physically penetrating an object using pins, needles, etc.), "astrictive" grippers (e.g., using suction or vacuum to pick up an object), or "contigutive" (e.g., using surface tension, freezing or adhesive to pick up object). Also, for example, other types of end effectors may be included such as, for example, drills, brushes, cutting tools, deburring tools, welding torches, and so forth.

The robot 180 also includes various sensors such as vision sensor 181 which, is a stereo camera in the illustrated embodiment. A stereo camera includes two or more sensors (e.g., charge-coupled devices (CCDs)), each at a different vantage point and generates, based on the data sensed by the two sensors, 3D scene point cloud data that includes a depth image with a plurality of data points defining depth values. An additional or alternative vision sensor may be provided in some implementations, such as a monographic camera, a laser scanner, etc.

In some implementations, the wheels 187A, 187B of the robot 180 may be controlled autonomously and/or semi-autonomously and/or the robot arms 184A, 184B and end effectors 185A, 185B may be controlled autonomously and/or semi-autonomously. For example, the robot 180 may position itself autonomously based on sensor inputs from vision sensor 181 and/or other sensors and/or based on parameters for a task being performed by the robot 180. Also, for example, robot 180 may autonomously control robot arms 184A, 184B and/or end effectors 185A, 185B based on parameters for a task being performed by the robot 180 and/or based on sensor inputs from vision sensor 181, torque and/or position sensors of the robot arms 184A, 184B and/or end effectors 185A, 185B, and/or other sensor(s).

In some implementations, as described herein, the robot arms 184A, 184B, the end effectors 185A, 185B, and/or other operational component(s) of the robot 180 may be physically manipulated by a human user. For example, in some implementations the robot 180 may set the mechanical impedance of one or more of its operational components, during one or more periods of time, such that physical manipulation by a user will cause one or more of the components to traverse to a plurality of poses. As used herein, a pose may reference both a position and an orientation, or just one of a position and an orientation.

As one example, the robot arms 184A, 184B and/or the end effectors 185A, 185B may be physically manipulated by a user to a plurality of unique positions in response to a user physically "grabbing", or otherwise contacting, one or more constituent components and applying force. For instance, the robot arms 184A, 184B and/or the end effectors 185A, 185B may be in a low mechanical impedance, "gravity-compensated" mode during all or portions of physical manipulations of the robot 100 by a user to make it relatively easy for the user to manipulate those operational components. As described herein, in some implementations, the amount of mechanical impedance may optionally vary based on stored preferences and/or based on user interface input provided by the user. Also, in some implementations, the mechanical impedance may additionally and/or alternatively vary based on the current pose of one or more operational components. For instance, the mechanical impedance may vary to provide haptic feedback to the user when the user is approaching limits of one or more operational components, such as positional operational limits.

The robot 180 also includes one or more processors that, for example: provide control commands to actuators and/or other operational components of the robot 180, such as control commands to enable physical manipulation by a user; central commands that activate one or more functions that are associated with an authorized user and/or that are dictated by an active user; and/or control commands that implement one or more aspects of authorization system 110 and/or robot functions adaptation system 120. Additional description of some examples of the structure and functionality of the processor and other components of robot 180 is provided herein.

In some implementations, additional and/or alternative robots may be provided in the environment of FIG. 1, such as robot 190 (e.g., FIG. 2) and/or other robots that vary in one or more respects from robots 180 and 190. In some of those implementations, each of one or more of the robots may embody all or aspects of systems 110 and/or 120 and/or communicate with all or aspects of such systems that are separate from the robot. Moreover, in some of those implementations, each of one or more of the robots may have access to, or may embody, one or more aspects of database 150.

The authorization system 110 includes an authorization parameters setting engine 112 that defines authorization parameters for the robot 180 and/or other robots and associates, in database 150, the authorization parameters with one or more users and/or one or more robot functions. The authorization system 110 also includes an authorization engine 114 that receives authorization input and determines whether the authorization input conforms to authorization parameters defined by the authorization parameters setting engine 112. If the authorization input conforms to the authorization parameters, the authorization engine 114 determines a valid authorization and may provide, to robot functions adaptation system 120, an indication of the valid authorization and/or an identifier of robot function(s) and/or user(s) that are mapped to the valid authorization (e.g., those mapped to the authorization parameters associated with the valid authorization).

In some implementations, the authorization parameters may include biometric authorization parameters (e.g., fingerprint, facial, voice) and the authorization input may include biometric input from a sensor of the robot and/or a sensor external to the robot (e.g., fingerprint sensor, vision sensor 181). In some implementations, the authorization parameters may additionally and/or alternatively include a passcode and/or password and the authorization input may include spoken, typed, or other human initiated input from a user interface input device of the robot and/or user interface input device external to the robot (e.g., a microphone, a keypad, a keyboard). In some implementations, the authorization parameters may additionally and/or alternatively include an NFC tag, RFID tag, and/or other identifier and the authorization input may include that identifier sensed by a corresponding reader of the robot and/or corresponding reader external to the robot.

As described in more detail with respect to FIGS. 2-7, in some implementations the authorization parameters set by the authorization parameters setting engine 112 include one or more authorization parameters associated with physical manipulation of the robot such as: one or more authorization positions for one or more components of the robot; one or more authorization orientations for one or more components of the robot; one or more authorization velocities for one or more components of the robot; and/or one or more authorization accelerations for one or more components of the robot. In those implementations, the authorization input received by the authorization engine 114 includes sensor data generated by one or more sensors of the robot in response to physical manipulation of the robot by a user that causes one or more components of the robot to traverse to a plurality of positions. The authorization engine 114 compares the authorization parameters to the sensor data, and/or to values generated based on the sensor data, to determine whether the authorization input conforms to the authorization parameters.

As one specific example, a "robot authorization parameter setting mode" may be initiated by the authorization parameters setting engine 112 to define authorization parameters for a user and/or for a robot (the authorization parameters may be specific to the user and/or to the robot). The robot authorization parameters setting mode may be initiated, for example, in response to a verbal command issued by a user, other user interface input provide by the user at the robot 180 and/or a computing device coupled to the robot 180, and/or in response to an initial powering on of the robot 180. The user may then manipulate a reference point of one or both of the end effectors 185A and 185B to particular positions and/or along particular path(s) to define robot authorization parameters for the robot. For example, the user may manipulate a reference point of the end effector 185A in a circle that lies in a particular plane. The authorization parameters setting engine 112 may then complete the robot authorization parameters setting mode in response to further user interface input and/or other criteria (e.g., a threshold amount of time without further physical manipulation).

The authorization parameters setting engine 112 may determine authorization parameters based on sensor data generated by sensors of the robot during the physical manipulation of the robot authorization parameter setting mode. For example, the authorization parameters setting engine 112 may utilize position readings from joint position sensors associated with joints that control the position of the end effector 185A to determine authorization positions of the reference point of the end effector 185A. The authorization positions may be defined in various manners, such as in joint space and/or in Cartesian/configuration space. A joint space authorization position of the reference point of the end effector 185A may be a vector of values that define the states of each of the operational components that dictate the position of the end effector 185A. A Cartesian space authorization position may utilize coordinates (e.g., "X", "Y", and "Z" coordinates) that define a location of the reference point of the end effector 185A relative to a reference location, such as a center of mass of the robot 180. In some implementations, the authorization parameters setting engine 112 may apply position readings from joint position sensors to a forward kinematic model of the robot 180 to determine authorization positions of the end effector 185A in Cartesian space.

After the authorization parameters are defined, the user may thereafter physically manipulate the robot in accordance with the authorization parameters to authorize the user (optionally after a verbal command and/or other user interface input to enter an "authorization mode"). As described with respect to robot functions adaptation system 120, the authorization may, for example, activate one or more inactive functionalities of the robot 180. For instance, the authorization may move the robot 180 out of a "sleep state" (e.g., a sleep state entered after X minutes of inactivity), may cause the robot 180 to enter into a "training mode" (e.g., where new paths, grasps, and/or tasks may be taught via further user manipulation of the robot), and/or may implement one or more functionalities of the robot 180 that are specific the particular user (e.g., the mechanical impedance of the robot may be set to be specific to preferences of the user, specific tasks that the robot may accomplish may require authorization by the user and/or other authorized users, etc.).

The authorization engine 114 may utilize various techniques to determine whether user physical manipulation of the robot conforms to authorization parameters for the robot. For example, conformance of the physical manipulation to authorization parameters defined as a plurality of authorization positions along a circle may require that: (1) at least 80% of the positions of the physical manipulation are within X distance of any one of the authorization positions along the circle defined by the authorization parameters and (2) that the positions of the physical manipulations include positions that are the same as, or within Y distance of, at least 80% of the authorization positions defined by the authorization parameters.

Although specific examples are provided above, many variations are possible. For example, various definitions of authorization parameters and/or various degrees of conformance (needed between the authorization parameters and the user manipulations for a successful authorization) may be utilized. For example, authorization positions may be defined to include positions along a particular "seed path" of the authorization, as well as positions encompassed by a corridor that surrounds those positions. The corridor allows for an error margin when the user is attempting to recreate the manipulation and unlock the robot. This may obviate the need for "soft matching" in determining conformance, or change the extent of such soft matching.

As yet another example, authorization positions may be defined as positions in a particular reference frame (e.g., a circle in a particular plane) or may be defined as relative positions in any reference frame (e.g., the circle in any plane). This may enable authorization based on the relative path of a manipulation. For example, this may enable authorization by manipulating the end effector in a circle along a "vertical" plane, or along a "horizontal plane", or along an "angled plane".

As yet another example, movement of the end effector and/or other components of the robot may be restricted in a "robot authorization parameter setting mode" and/or in an "authorization mode". For example, in both modes the reference point of the end effector may be restricted to movement along a single planar segment to effectively limit authorizations to two-dimensional movements in that planar segment. Also, for example, in both modes the reference point of the end effector may be restricted to movement within a particular bounding box or other three-dimensional segment that is smaller than the workspace of the end effector. Also, for example, in the "authorization mode", the movement of the end effector may be restricted to movement along a limited number of vectors at any particular point in time, where one of the vectors conforms to one or more of the authorization positions, and the other vectors do not. This may effectively "guide" the user to selection among a finite number of paths, while still requiring the user to have knowledge of, and select, the correct path.

As yet another example of a variation, the "robot authorization parameter setting mode" may be omitted and authorization parameters set separately (e.g., during manufacture of a robot and/or via a separate graphical user interface). As yet another example, velocity and/or acceleration along one or more portions of a path may additionally and/or alternatively be taken into account. For instance, authorization may require positional conformance as well as velocity conformance.

The robot functions adaptation system 120 includes a robot functions determination engine 122 that determines one or more robot functions that are applicable to an active user. In some implementations, the robot functions determination engine 122 determines one or more robot functions based on the functions being mapped, in database 150, to authorization parameters and/or a user of a valid authorization determined by authorization system 110. For example, the robot function(s) may include one or more modes, tasks, and/or physical control parameters that are mapped to the authorization parameters and/or to the user of a valid authorization.

In some implementations, the robot functions determination engine 122 additionally and/or alternatively determines one or more robot functions based on input provided by an active user via one or more user interface input devices incorporated as part of the robot 180 and/or otherwise associated with the robot 180 (e.g., separate from, but in communication with, the robot 180). For example, a user may provide one or more verbal commands via a microphone associated with the robot 180 and the robot functions determination engine 122 may determine one or more robot function(s) that are mapped to the verbal commands.

The robot functions activation engine 124 activates the one or more robot functions determined by the engine 122. For example, where the robot functions include physical control parameters, the robot functions activation engine 124 may provide commands to one or more actuators of the robot 180 to implement the physical control parameters. For instance, where the physical control parameters are determined based on a valid authorization, the robot functions activation engine 124 may activate the physical control parameters immediately following the valid authorization, or after some subsequent user interface input. Also, for instance, where the physical control parameters are determined based on a verbal command provided by the user, the robot functions activation engine 124 may activate the physical control parameters immediately following the verbal command, or after some subsequent user interface input. As another example, where the robot functions include a mode and/or task, the robot functions activation engine 124 may cause the robot 180 to enter the mode or the task immediately, or after some subsequent user interface input.

As described above, in some implementations the robot functions adaptation system 120 may adapt one or more physical control parameters of a robot. Physical control parameters of a robot affect the response of one or more operational components (e.g., servo motors or other actuators) of the robot when the robot is physically manipulated by a user and may include, for example, impedance of the robot, the "locking" of one or more degrees of freedom of the robot, restricting the freedom of movement of one or more reference points of the robot (e.g., a reference point of the end effector), etc. In some implementations, the physical control parameters affect the response of operational components of the robot during training of the robot, such as training via physical manipulation.

As one example, the physical control parameters may include mechanical impedance parameter(s) that affect the "resistance" of the robot in response to physical manipulation of the robot by a user. For example, a "low" mechanical impedance may enable manipulation of the end effector as if it were moving through air, a "medium" mechanical impedance may enable manipulation of the end effector as if it were moving through water, and a "high" mechanical impedance may enable manipulation of the end effector as if it were moving through mud. The mechanical impedance parameters may be implemented by the robot functions activation engine 124 by adjusting values associated with actuators of the robot 180. For example, the engine 124 may adjust values associated with actuators of the robot 180 that control the position of end effector 185A to achieve a desired mechanical impedance for movement of the end effector 185A.

As another example, the physical control parameters may lock one or more degrees of freedom, such as locking one or more of the actuators that control the position of an end effector. As yet another example, the physical control parameters may restrict freedom of movement of an operational component, such as an end effector. For instance, the "vertical" and/or "horizontal" positions of the end effector may be locked. Also, for instance, the movement of the end effector may be restricted to a subspace of the reachable working space of the end effector.

As one particular example, a user may be authorized for a robot and a training mode of the robot entered. Impedance preferences of the user for the training mode may be identified based on the preferences being associated with the user—and those preferences implemented by the robot. The user may manipulate the robot during the training mode, which will be affected by the impedance preferences. The user may then further provide user interface input to lock a vertical position of the end effector during the training (e.g., to restrict movement of the end effector along a table or other planar surface). The user may then continue the training by further manipulation of the end effector, where the further manipulation is affected by the impedance preferences and is restricted by the locking of the vertical position of the end effector. Further user interface input may be provided during training to further adapt these and/or other physical control parameters of the robot.

The one or more client computing devices 105 are optional and may enable a user to initiate and/or conclude an authorization parameters setting mode, to initiate and/or conclude an authorization mode, to define and/or refine authorization parameters, and/or to explicitly define which functions are to be mapped to which authorization parameters and/or to which users. For example, one of the computing devices 105 may be utilize to define, in database 150, one or more aspects of authorization parameters, one or more functions mapped to authorization parameters, and/or one or more users mapped to authorization parameters and/or functions.

Turning now to FIGS. 2-8, additional description is provided of implementations of authorization system 110 and of authorizing one or more functionalities of a robot based on a user physically manipulating the robot.

Figure 2:
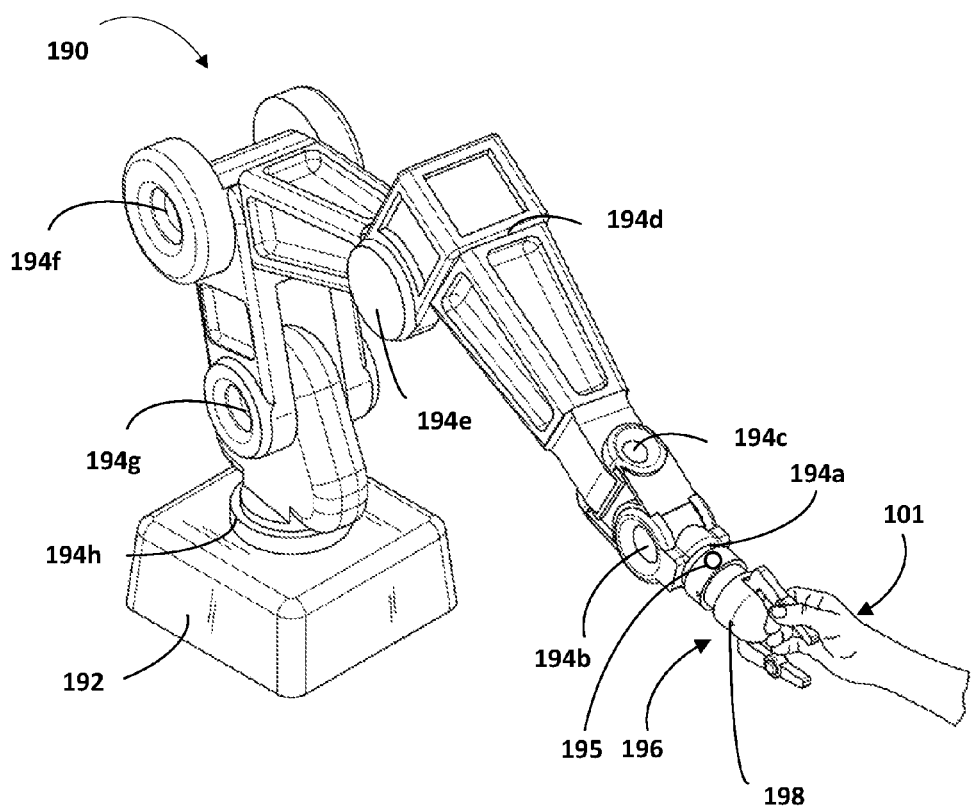
FIG. 2 illustrates an example robot arm and a user grasping an end effector of the robot arm during physical manipulation of the robot arm.

FIG. 2 illustrates an example robot arm 190 and a user's hand 101 grasping an end effector 196 of the robot arm during manipulation of the robot arm 190. The illustrated robot arm 190 includes a base 192 and includes eight operational components 194a-h that provide degrees of freedom for the robot provide the robot arm 190 with kinematic redundancy. As used herein, an "operational component" of a robot may refer to actuators, motors (e.g., servo motors), joints, shafts, gear trains, pumps (e.g., air or liquid), pistons, drives, and/or other components that may create and/or undergo propulsion, rotation, and/or motion. Some operational components may be independently controllable, although this is not required. In some instances, the more operational components robot 190 has, the more degrees of freedom of movement it may have. Robot 190 may include other operational components, but those are not labeled in FIG. 2 for the sake of clarity and brevity.

Robots typically, and robot 190 in particular, may have multiple degrees of freedom of movement. For example, each of the operational components 194a-h may include an actuator that enables controllable rotation about a respective axis. Accordingly, it is possible for robot 190 to traverse any one of a plurality of possible paths when moving reference point 198 from a first location to a second location. Moreover, the kinematic redundancy of the robot 190 enables the robot 190 to traverse along the same path in multiple ways, each time striking a different set of orientations along the path. As used herein, an "orientation" of a robot refers to a particular configuration of components of a robot relative to one another at a particular position of the reference point 198 (e.g., a "snapshot"). When robot 190 is inactive, it may be in (or "strike") a single orientation until it moves again. When robot 190 moves the reference point 198 along a path, it may strike a series of orientations to effectuate the movement along the path.

The end effector 196 is also an operational component. As used herein, "end effector" may refer to a variety of tools that may be operated by robot 190 in order to accomplish various tasks. In FIG. 2 and other Figures herein, for example, end effector 196 takes the form of a claw with two opposing "fingers" or "digits." The reference point 198 may be a point of end effector 196 that traverses a particular path when robot 190 moves between sites. In some implementations, reference point 198 may be a center of mass of end effector 196, and/or a point near where end effector 196 attaches to robot 190, though this is not required.

Robot 190 also includes a user interface element 195 located on an exterior surface of the robot 190 between operational component 194a and end effector 196. In some implementations where the end effector 106 is removably attached, the user interface element 195 may be located near an end effector attachment area where the end effector 196 may be attached and removed. In other implementations, the user interface element 195 may be provided on the end effector 196 itself, or on another component of the robot 190 such as base 192, an area between operational component 194f and 194e, etc. In yet other implementations, and as described in more detail herein, the user interface element 195 may be located remote from the robot 100, such as a virtual user interface element provided via a tablet or other computing device. In yet other implementations, the user interface element 195 may be absent and a user may optionally provide spoken input, gestures, and/or other user interface input.

The illustrated user interface element 195 may be, for example, a mechanical push-button, a non-mechanical touch-sensitive button, or a fingerprint sensor. For example, the mechanical push-button may be a spring-biased push-button switch that provides haptic feedback to enable a user to ascertain whether the push-button is actuated. Also, for example, the non-mechanical touch-sensitive button may be a capacitive touch-sensitive element that may optionally communicate with one or more components to provide haptic (e.g., vibration), visual, audible, and/or other feedback to enable a user to ascertain when and/or how the element has been actuated. In some implementations, the user interface element 195 may be actuated or otherwise contacted to, for example: initiate and/or conclude the setting of authorization parameters; initiate and/or conclude physical manipulations corresponding to an authorization of the robot arm 190; and/or to indicate that a current position and/or orientation of one or more operational components of the robot arm 190 are intended to be analyzed for authorization parameters and/or an authorization.

Figure 3:
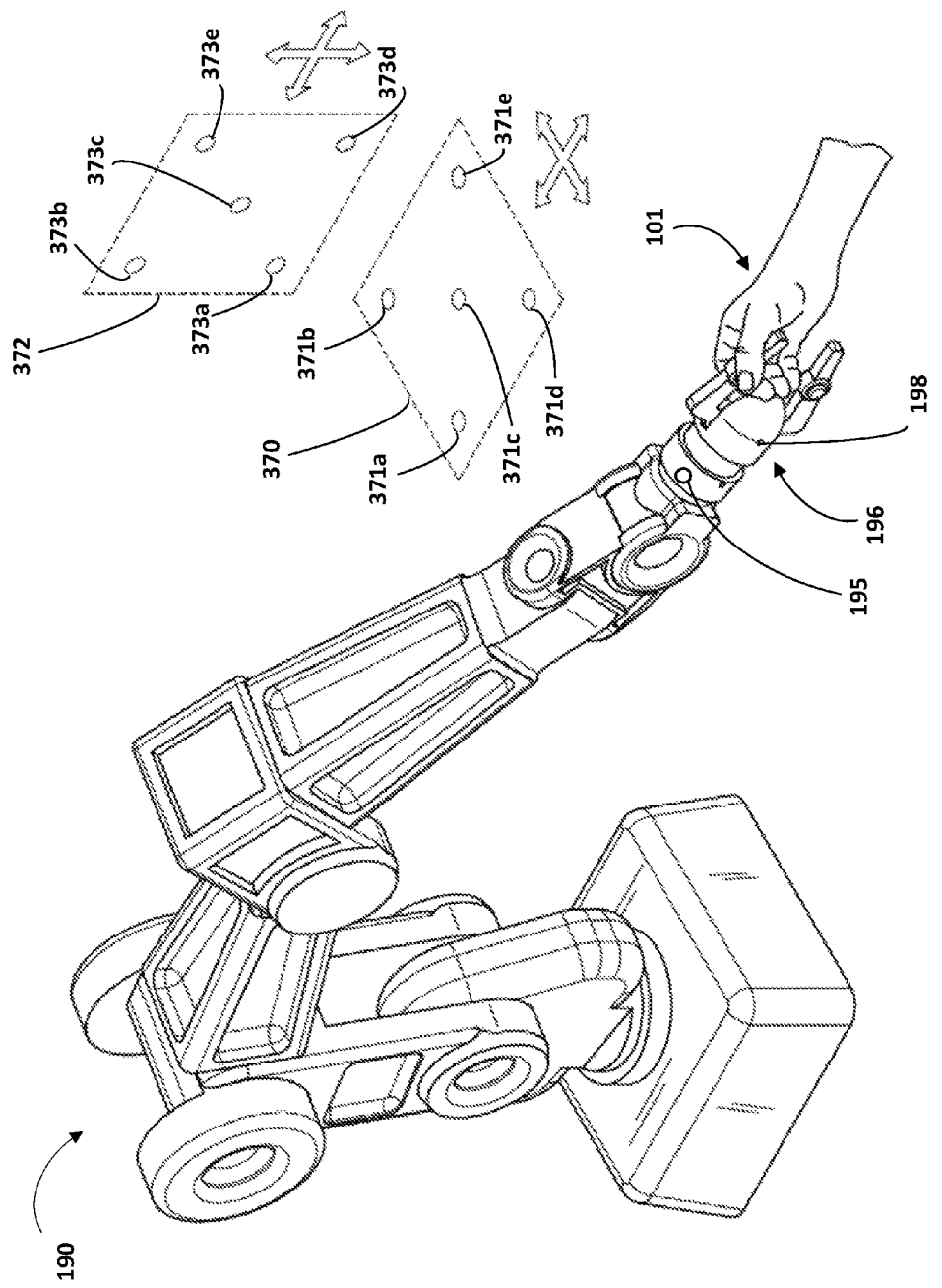
FIG. 3 illustrates the example robot arm of FIG. 2, a user grasping the robot arm's end effector, and illustrates an example of manipulation constraints that may be imposed by the robot arm during physical manipulation of the robot arm by the user related to authorization of the robot arm.
Figure 4:
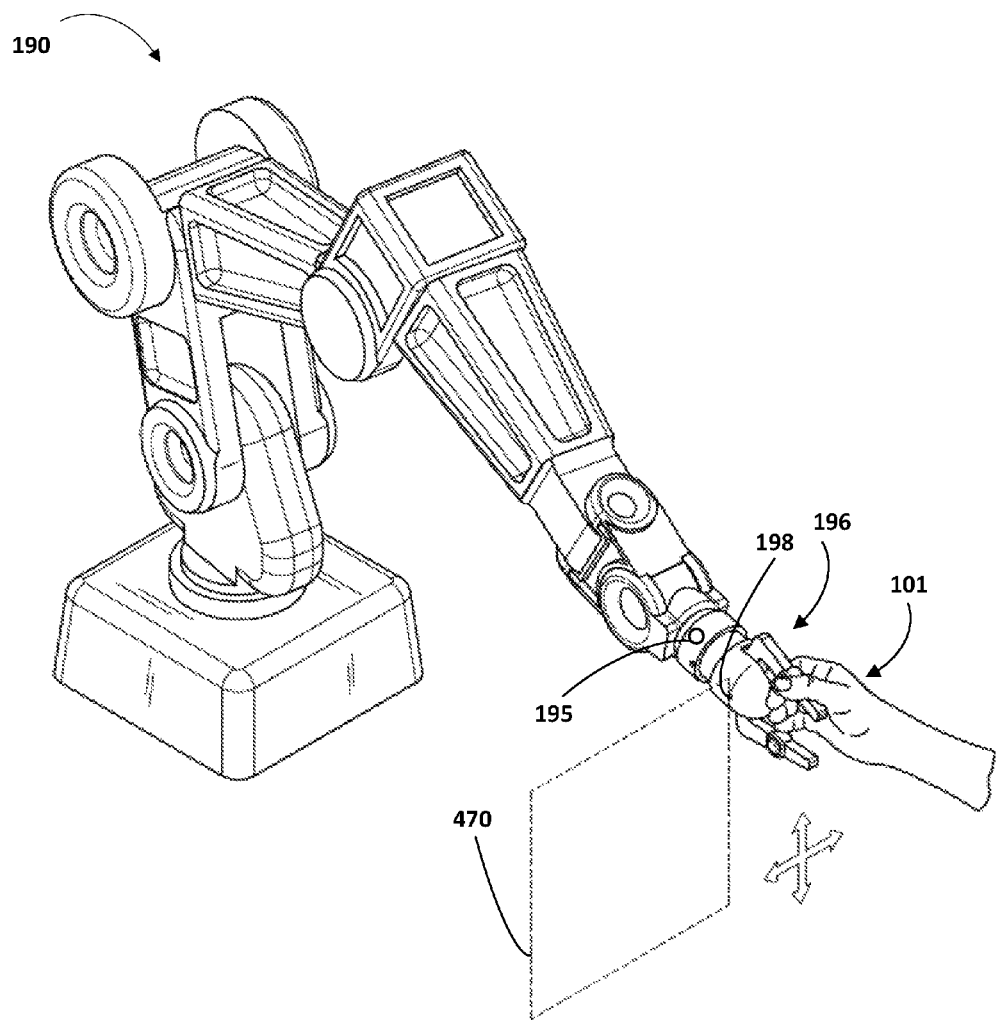
FIG. 4 illustrates the example robot arm of FIGS. 2 and 3, a user grasping the robot arm's end effector, and illustrates another example of manipulation constraints that may be imposed by the robot arm during physical manipulation of the robot arm by the user related to authorization of the robot arm.
Figure 5:
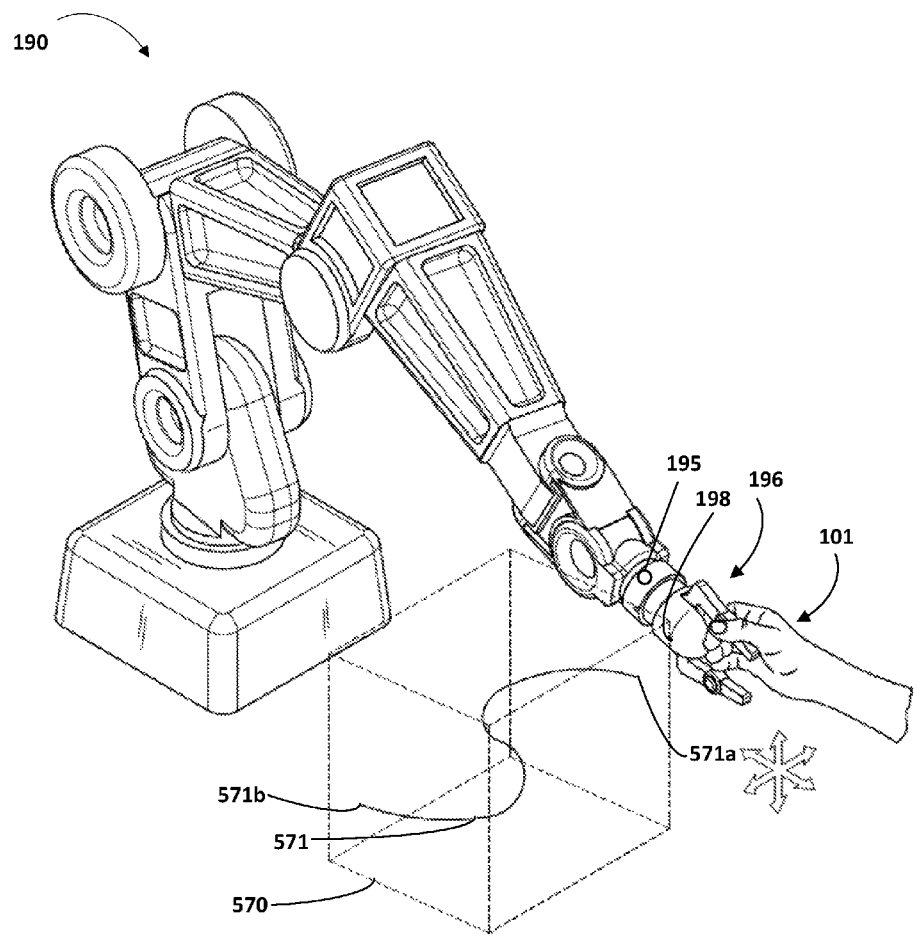
FIG. 5 illustrates the example robot arm of FIGS. 2-4, a user grasping the robot arm's end effector, and illustrates yet another example of manipulation constraints that may be imposed by the robot arm during physical manipulation of the robot arm by the user related to authorization of the robot arm.

FIGS. 3-5 each illustrate the example robot arm 190 of FIG. 2, a user's hand 101 grasping the robot arm's end effector 196, and examples of manipulation constraints that may be imposed by the robot arm 190 during physical manipulation of the robot arm by the user related to authorization of the robot arm. For example, in implementations where setting authorization parameters includes a user physically manipulating the robot arm 190, the manipulation constraints may be set by the authorization parameters setting engine 112 during such physical manipulation. Also, for example, in implementations where authorization includes a user physically manipulating the robot arm 190, the manipulation constraints may be set by the authorization engine 114 during such authorization. It is noted that only end effector 196, end effector reference point 198, and user interface element 195 of robot 190 are numbered in FIGS. 3-5 for the sake of simplifying those figures.

In FIG. 3, the manipulation constraints include a first group of positions 371*a-e* in a first plane 370 and a second group of positions 373*a-e* in a second plane 372 that is perpendicular to the first plane 370. Based on the example manipulation constraints of FIG. 3, the authorization system 110 may restrict physical manipulation of the end effector reference point 198 to the positions in the first and second group of positions 371*a-e* and 373*a-e*. For example, in response to physical manipulation of the robot arm 190, the end effector reference point 198 may "snap" between the positions 371*a-e* and 373*a-e*, optionally providing feedback (e.g., haptic, visual, and/or audible feedback) to the user as each of the positions 371*a-e* and 373*a-e* are encountered. For instance, if the reference point 198 is at position 371*a*, the user may be restricted to moving the reference point 198 to any one of positions 371*b*, 371*c*, and 371*d*. Which of positions 371*b*, 371*c*, and 371*d* is encountered in response to physical manipulation by the user, will be dependent on the direction of force applied to the robot arm 190 by the user. For instance, force applied on the end effector 196 in a direction toward position 371*b* may cause the robot arm 190 to "snap" to position 371*b*.

Through the manipulation constraints of FIG. 3, the user is effectively restricted to manipulating the reference point 198 between ten positions 371*a-e* and 373*a-e*. In setting authorization parameters for the robot arm 190 and/or in authorizing the robot arm 190, the user may optionally actuate or otherwise contact the user interface element 195 at certain of the positions to indicate that position is a position for use in the authorization parameters and/or in the authorization. For example, to set authorization positions of authorization parameters, the user may first manipulate the reference point 198 to position 371*a* and actuate the user interface element 195, then progress to position 371*b* without actuating the user interface element 195, then progress to position 371*e* and actuate the user interface element 195, then progress to position 373*d* and actuate the user interface element 195. Accordingly, in such an example the authorization parameters may include an ordered group of authorization positions that correspond to positions 371*a*, 371*e*, and 373*d*. The user may thereafter authorize the robot arm 190 based on those authorization parameters by actuating the user interface element 195 at positions 371*a*, 371*e*, and 373*d*, in that order. As described herein, in some implementations additional and/or alternative authorization parameters may be set, such as orientation(s) of the end effector 196 at the positions 371*a*, 371*e*, and 373*d*.

Although particular planes 370, 372 and particular positions 371*a-e* and 373*a-e* are shown, variations are possible. For example, more or fewer planes may be provided and/or more or fewer positions may be provided in one or more of the provided planes. Also, for example, multiple planes may be provided at alternative orientations. For instance, multiple planes may be stacked vertically atop one another, stacked horizontally relative to one another, and/or provided at non-perpendicular and non-parallel angles relative to one another.

In FIG. 4, the manipulation constraints include a single planar segment 470, indicated by the dashed lines in FIG. 4, to which physical manipulation of the robot arm 190 is restricted. For example, in response to physical manipulation of the robot arm 190, the authorization system 110 may restrict movement of reference point 198 to movement within the bounds of the planar segment 470. Which positions within the planar segment 470 are encountered in response to physical manipulation by a user, will be dependent on the direction of force applied to the robot arm 190 by the user. For instance, the user may apply force in varying directions to move the end effector along any planar group of positions within the planar segment 470, such as positions that collectively define a circle, a square, a triangle, an "S", a "check mark", and/or other symbol.

In setting authorization parameters for the robot arm 190 and/or in authorizing the robot arm 190, the user may optionally actuate or otherwise contact the user interface element 195 to indicate which positions should be considered. For example, the user may actuate the user interface element 195 to indicate the initiation of an authorization and may actuate the user interface element 195 again to indicate the conclusion of an authorization. Also, for example, the user may actuate (e.g., click) the user interface element 195 to indicate the initiation of an authorization, may continue to actuate (e.g., hold the click) the user interface element 195 during the authorization, and may cease actuation of (e.g., release) the user interface element 195 to indicate the conclusion of the authorization. As yet another example, the user may actuate the user interface element 195 at a first position to indicate the first position should be considered, at a second distinct position to indicate the second position should be considered, etc.

As yet another example, the user may actuate the user interface element 195 when the reference point 198 is at a first corner of the planar segment 470, then move the reference point to another corner of the planar segment 470 and again actuate the user interface element 195, then maintain actuation of the user interface element 195 and manipulate the reference point 198 in a circle in the planar segment 470. Based on such physical manipulations and actuations of the user interface element 195, the authorization parameters setting engine 112 may define a sequence of authorization positions that conform to the two corners of the planar segment 470, followed by the circle. The authorization positions may be defined as positions in the planar segment 470, or as relative positions in any planar segment. To authorize the robot based on those authorization parameters, the user may repeat, in the planar segment 470 or another planar segment, the movements of the reference point 198 and the actuations of the user interface element 195. The authorization engine 114 may determine conformance between the authorization and the authorization parameters based on one or more criteria.

Although a particular planar segment 470 is shown, variations are possible. For example, the planar segment may be smaller, larger, and/or occupy different positions. For instance, the planar segment may be "horizontal" or at another "non-vertical" orientation. Also, for example, the planar segment may have a non-rectangular periphery, such as a periphery that is circular, triangular, and/or other shape.

In FIG. 5, the manipulation constraints include a single three-dimensional ("3D") segment 570 to which physical manipulation of the end effector 196 is restricted. For example, in response to physical manipulation of the robot arm 190, the reference point 198 may only move within the bounds of the 3D segment 570, indicated by the dashed lines in FIG. 5. The 3D segment 570 occupies a space that is a subset of the working space accessible by the end effector reference point 198 when no manipulation constraints are applied. Through the manipulation constraints of FIG. 5, the user is restricted to movement within the 3D segment 570, and which positions within the 3D segment 570 are encountered in response to physical manipulation by a user will be dependent on the direction of force applied to the robot arm 190 by the user.

One example path 571 that may be traversed by the end effector reference point 198 within the 3D segment 570 in response to physical manipulation by the user is illustrated in FIG. 5. For instance, the user may apply force in varying directions to move the end effector reference point 198 along the path 571 within the 3D segment 570. The path 571 is generally "S" shaped and begins at a first end 571*a* on a first planar face of the 3D segment 570, varies along all three dimensions of the 3D segment 570, and ends at a second end 571*b* of a second planar face of the 3D segment 570 that is opposite the first planar face. Authorization parameters may be determined by engine 112 based on positions, orientations, velocities, and/or accelerations of the end effector reference point 198 along the path 571. Likewise, values to compare to authorization parameters may be determined by engine 114 based on based on positions, orientations, velocities, and/or accelerations of the end effector reference point 198 along the path 571.

Although a particular 3D segment 570 and path 571 are shown, variations are possible. For example, the 3D segment may be smaller, larger, and/or occupy different positions. Also, for example, the 3D segment may have other shapes, such as a spherical, conical, and/or other shape. Also, for example, multiple disconnected 3D segments may be provided, such as two spherical 3D segments that are separated from one another. Also, for example, different paths may be traversed within the 3D segment 570 via physical manipulation of the robot 190 by a user.

Figure 6:
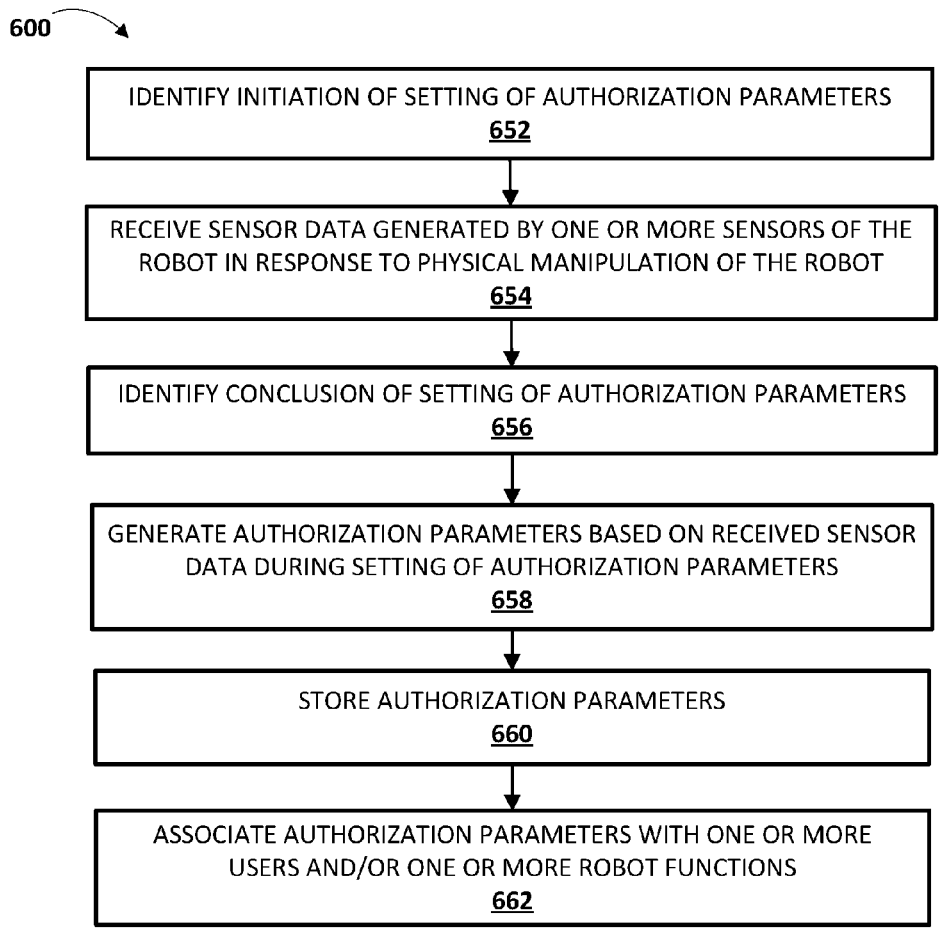
FIG. 6 is a flowchart illustrating an example method of associating authorization parameters with one or more users and/or one or more robot functions.

FIG. 6 is a flowchart illustrating an example method 600 of associating authorization parameters with one or more users and/or one or more robot functions. For convenience, the operations of the flow chart are described with reference to a system that performs the operations. This system may include various components of various computer systems, such as authorization parameters setting engine 112 of FIG. 1. Moreover, while operations of method 600 are shown in a particular order, this is not meant to be limiting. One or more operations may be reordered, omitted or added.

At block 652, the system identifies an initiation of setting of authorization parameters. In some implementations, the initiation is based on receipt of user interface input from a user interface input device of a robot and/or user interface input device external to the robot. For example, the initiation may be a verbal command provided via a microphone, a typed input provided via a keyboard, an actuation of a button of the robot, etc. In some implementations, the initiation is based on identifying another authorization, such as a "master authorization" that enables new authorization parameters to be set. In some of those implementations, the other authorization may itself be an authorization based on a physical manipulation.

At block 654, the system receives sensor data generated by one or more sensors of the robot in response to physical manipulation of the robot by a human user. For example, the physical manipulation may cause an end effector of the robot to traverse to a plurality of positions, and the sensor data may be generated by sensors of joints that control the position of the end effector. Also, for example, the physical manipulation may cause the end effector of the robot to traverse to a plurality of positions, and the sensor data may be generated by vision sensors viewing the end effector at one or more of the positions.

At block 656, the system identifies a conclusion of the setting of the authorization parameters. In some implementations, the conclusion is based on receipt of user interface input from a user interface input device of a robot and/or user interface input device external to the robot. In some implementations, the conclusion is based on passage of a threshold amount of time without further physical manipulation. In some implementations, the conclusion is based on sensing that a user is no longer physically touching and/or manipulating a robot.

At block 658, the system generates authorization parameters based on the sensor data received during the setting of the authorization parameters. For example, where the sensor data includes sensor data generated by sensors of joints that control the position of an end effector, the sensor data may be utilized as the authorization parameters. For instance, the authorization parameters may include a plurality of positions of the end effector, wherein those positions are defined in joint space (i.e., defined by the positions of the joints that control the position of the end effector). Also, for example, where the sensor data includes sensor data generated by sensors of joints that control the position of an end effector, the sensor data may be applied to a forward kinematic model of the robot to determine positions of the end effector in Cartesian space.

As yet another example, where the sensor data includes sensor data generated by vision sensors of the robot, the system may utilize one or more images from the sensor data as the authorization parameters and/or determine one or more positions of the end effector based on the images and utilize those positions as the authorization parameters. As yet another example, one or more orientations of an end effector, velocities of the end effector, and/or accelerations of the end effector may be determined and utilized as authorization parameters in addition to, or instead of, positions of the end effector.

At block 660, the system stores authorization parameters. For example, the system may store the authorization parameters in one or more non-transitory computer readable media of the robot and/or external to the robot. The authorization parameters may be stored and associated with only the robot (e.g., so that functionality of only the particular robot can be "unlocked" with the authorization parameters) and/or with multiple robots (e.g., so that functionality of any of the multiple robots can be "unlocked" with the authorization parameters).

At block 662, the system associates the stored authorization parameters with one or more users and/or one or more robot functions. For example, a mapping between the authorization parameters and the users and/or robot functions may be stored in the one or more non-transitory computer readable media. In some implementations, a separate computing device may be utilized to associate users and/or robot functions with stored authorization parameters. For example, a separate computing device may be utilized to define which functions are activated in response to an authorization based on the authorization parameters. In some implementations, user interface input via the robot may be utilized to associate users and/or robot functions with stored authorization parameters. In some implementations, some functions may be associated with stored authorization parameters based on future robot interactions that occur during authorizations based on the authorization parameters. For example, if a user utilizes authorization parameters to make use of a robot and, during such use, provides user interface input to set a particular mechanical impedance of the robot, that mechanical impedance may be associated with the stored authorization parameters.

Figure 7:
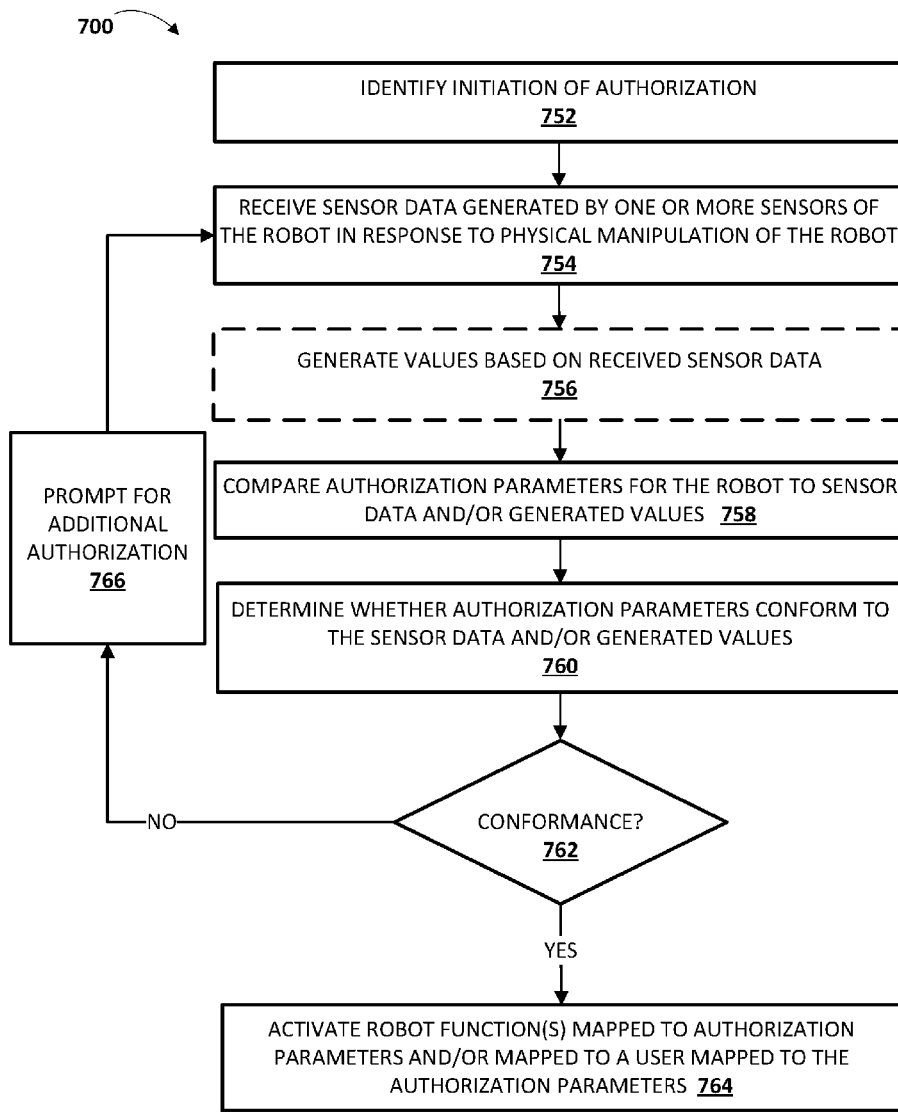
FIG. 7 is a flowchart illustrating an example method of activating one or more functionalities of a robot based on a user physically manipulating the robot.

FIG. 7 is a flowchart illustrating an example method 700 of activating one or more functionalities of a robot based on a user physically manipulating the robot. For convenience, the operations of the flow chart are described with reference to a system that performs the operations. This system may include various components of various computer systems, such as authorization engine 114 of FIG. 1. Moreover, while operations of method 700 are shown in a particular order, this is not meant to be limiting. One or more operations may be reordered, omitted or added.

At block 752, the system identifies initiation of an authorization. In some implementations, the initiation is based on receipt of user interface input from a user interface input device of a robot and/or user interface input device external to the robot. For example, the initiation may be a verbal command provided via a microphone, a typed input provided via a keyboard, an actuation of a button of the robot, etc. In some implementations, the initiation is based on sensing of a user physically touching and/or manipulating a robot.

At block 754, the system receives sensor data generated by one or more sensors of the robot in response to physical manipulation of the robot. For example, the physical manipulation may cause an end effector of the robot to traverse to a plurality of positions, and the sensor data may be generated by sensors of joints that control the position of the end effector. Also, for example, the physical manipulation may cause the end effector of the robot to traverse to a plurality of positions, and the sensor data may be generated by vision sensors viewing the end effector at one or more of the positions.

At optional block 756, the system generates values based on the received sensor data. For example, where the sensor data includes sensor data generated by sensors of joints that control the position of an end effector, the sensor data may be applied to a forward kinematic model of the robot to determine positions of the end effector in Cartesian space. As yet another example, where the sensor data includes sensor data generated by vision sensors of the robot, the system may determine one or more positions of the end effector based on the images and utilize those positions as the authorization parameters. As yet another example, one or more orientations of an end effector, velocities of the end effector, and/or accelerations of the end effector may be determined and utilized in addition to, or instead of, positions of the end effector.

At block 758, the system compares authorization parameters for the robot to the sensor data of block 754 and/or to the generated values of block 756. For example, where the authorization parameters include positions, orientations, velocities, and/or accelerations in Cartesian space, the system may compare the generated values of block 756 to the authorization parameters. Where the authorization parameters additionally or alternatively include one or more values in joint space, one or more images, and/or other "raw" sensor data, the system may compare the sensor data of block 754 to the authorization parameters.

At block 760, the system determines whether the authorization parameters conform to the sensor data and/or to the generated values. The system may utilize various techniques to determine whether user physical manipulation of the robot conforms to authorization parameters for the robot. For example, conformance of the physical manipulation to authorization parameters defined as a plurality of positions may require that: (1) at least 80% of the positions of the physical manipulation are within X distance of any one of the positions defined by the authorization parameters and (2) that the positions of the physical manipulations include positions that are the same as, or within Y distance of, at least 80% of the positions defined by the authorization parameters.

At block 762, if the system determines there is not conformance at block 760, the system proceeds to block 766 and prompts for an additional authorization. The system may optionally provide audible, visual, and/or haptic feedback to the user via the robot and/or a separate user interface output device to prompt for the additional authorization. In some other implementations, the prompt for the additional authorization may be the lack of "successful feedback" to the user. The system then proceeds to block 754. In some implementations, the number of iterations of block 766 may be limited. For example, after a set number of non-conforming authorization attempts, the robot may be "locked" and separate authorization required before any further authorizations are attempted.

At block 762, if the system determines there is conformance at block 760, the system proceeds to block 764. At block 764, the system activates one or more robot functions mapped to the authorization parameters and/or mapped to a user mapped to the authorization parameters. For example, the system may move the robot out of a "sleep state", may cause the robot to enter into a "training mode", may enable activation of one or more particular tasks of the robot, may implement one or more functionalities of the robot that are specific the particular user, and/or may activate other functions mapped to the authorization parameters and/or to a user mapped to the authorization parameters.

Although aspects of FIG. 6 and FIG. 7 are described with respect to an authorization based solely on physical manipulation of a robot, it is understood that in some implementations authorizations may be based on physical manipulation and one or more additional authorization parameters, such as biometric authorization parameters.

FIG. 8 illustrates an example graphical user interface that may be provided via a display of a tablet computing device or other computing device. The graphical user interface of FIG. 8 can be utilized to facilitate defining authorization parameters for an authorization of a robot and/or for defining one or more functions of the robot for the authorization. In some implementations, access to the graphical interface of FIG. 8 may require separate authorization (e.g., a password authorization at the computing device rendering the graphical user interface). The computing device that generates the graphical user interface and/or that receives user interface input associated with the interface, may be in communication with the authorization system 110 and/or the database 150. The computing device may, in response to user interface input, provide various associated data to authorization system 110 and/or for storage in database 150.

The graphical user interface includes a first interface element 805A that facilitates the setting of physical manipulation authorization parameters. For example, a user may select the first interface element 805A to initiate a robot authorization parameters setting mode and may select the first interface element 805A again to conclude the robot authorization parameters setting mode. During the robot authorization parameters setting mode, the user may physically manipulate the robot to generate sensor data utilized to define a plurality of the authorization parameters. In some implementations, the user may additionally and/or alternatively manipulate the graphical representation 800 of the robot, or other portions of the graphical interface of FIG. 8, to define and/or refine the authorization parameters. For example, the user may "select", via the graphical user interface, the end effector of the graphical representation, "drag" the end effector to various positions, and those positions utilized to generate authorization parameters.

The graphical user interface also includes a second interface element 805B that facilitates the defining of modes and/or tasks that are available for an authorization corresponding to the authorization parameters set via the first interface element 805A. For example, a user may select the second interface element 805B to receive a list of modes and/or tasks for the robot. The user may then select certain of the modes and/or tasks to associate with the authorization. For example, the user may select a training mode to make the training mode available when a robot is authorized utilizing the authorization parameters.

The graphical user interface also includes a third interface element 805C that facilitates the defining of physical control parameters that are available for an authorization corresponding to the authorization parameters set via the first interface element 805A. For example, a user may select the second interface element 805B to define one or more desired mechanical impedances and/or other physical control parameters that may be set for the robot in response to authentications that utilize the authorization parameters.

Although a particular graphical user interface is illustrated in FIG. 8, additional and/or alternative graphical user interfaces may be provided. Moreover, in some implementations authorization parameters for an authorization of a robot and/or for one or more functions of the robot for the authorization may be defined without use of a graphical user interface.

Figure 9A:
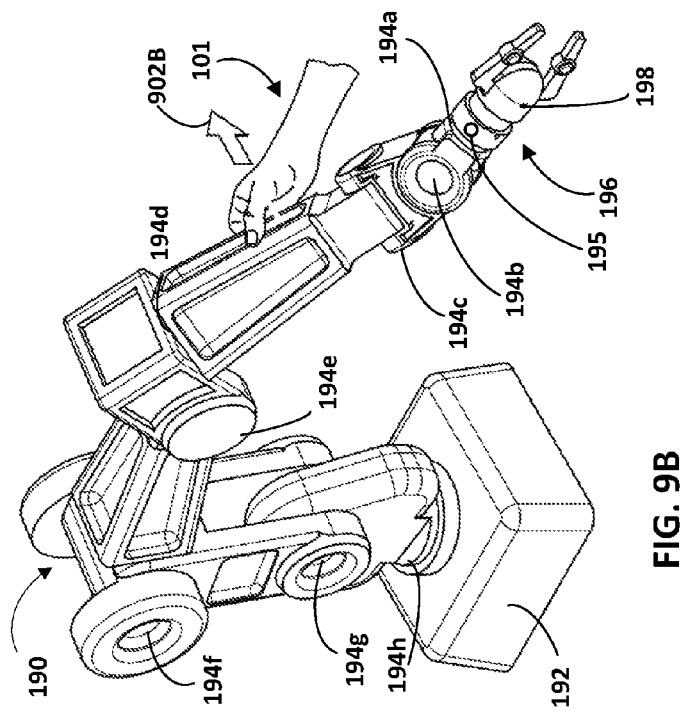
FIGS. 9A and 9B illustrate the example robot arm of FIGS. 2-5, with a position and orientation of an end effector of the robot being locked by the robot arm during manipulation of the robot arm by a user.
Figure 9B:
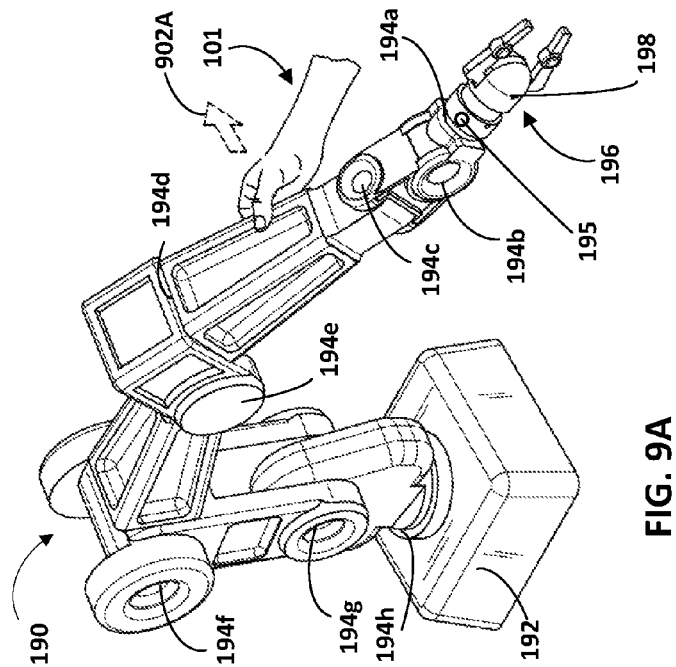

FIGS. 9A and 9B illustrate the example robot arm 190 of FIGS. 2-5, with a pose of the end effector 196 of the robot 190 being locked by the robot arm 190 during manipulation of the robot arm 190 by a user. FIGS. 9A and 9B illustrate an example of a physical control parameter that restricts the freedom of movement of the reference point 198 of the end effector 196. In particular, in FIGS. 9A and 9B, the freedom of movement of the reference point 198 of the end effector 196 is completely locked, thereby fully locking the position and the orientation of the end effector 196. As described herein, in some implementations the robot functions adaptation system 120 may implement the physical control parameter illustrated in FIGS. 9A and 9B based on it being mapped, in database 150, to authorization parameters and/or a user of a valid authorization determined by authorization system 110. As also described herein, in some implementations the physical control parameter illustrated in FIGS. 9A and 9B may be implemented based on input (e.g., a verbal command) provided by an active user via one or more user interface input devices incorporated as part of the robot 190 and/or otherwise associated with the robot 190.

A hand 101 of the user is illustrated in FIGS. 9A and 9B. In FIG. 9A, the user's hand 101 is contacting a component of the robot 190 that extends between joint 194*d* and joint 194*c*. FIG. 9A is prior to the user's hand 101 applying force, indicated by arrow 902A in FIG. 9A, where the force causes the component of the robot 190 to rotate about the joint 194*d*. As indicated by arrow 902B of FIG. 9B, the user's hand 101 has applied the force that causes the component of the robot 190 to rotate about the joint 194*d*. Notably, in FIG. 9B the component of the robot 190 that extends between joint 194*d* and joint 194*c* has rotated. However, the position and orientation of the end effector 196 has been maintained via appropriate actuator movements at operational components 194*a*, 194*b*, and 194*c*. One or more processors of the robot 190 may apply various techniques to maintain a position and orientation of the end effector 196, such as techniques that adjust the position of one or more joints that control the position of the end effector 196, so that the adjusted positions place components in one or more kinematically redundant poses to maintain the position and orientation of the end effector 196.

Figures 10A, 10B:
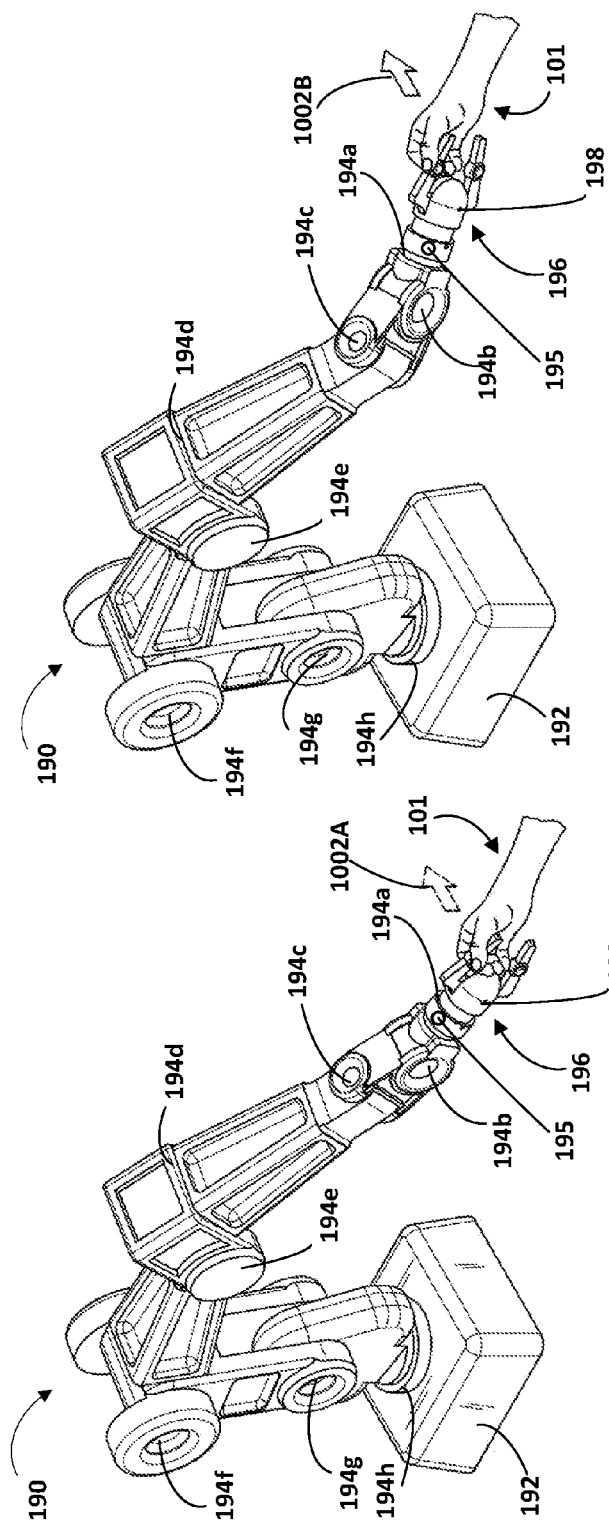
FIGS. 10A and 10B illustrate the example robot arm of FIGS. 2-5 and 9A-9B, with multiple degrees of freedom of the robot arm being locked during manipulation of the robot arm by a user.

FIGS. 10A and 10B illustrate the example robot arm 190 of FIGS. 2-5 and 9A-9B, with multiple degrees of freedom of the robot arm 190 being locked during manipulation of the robot arm by a user. FIGS. 10A and 10B illustrate an example of a physical control parameter that locks one or more degrees of freedom of the robot arm 190. In particular, in FIGS. 10A and 10B the freedom of movement of operational components 194*d-h* have been locked. As described herein, in some implementations the robot functions adaptation system 120 may implement the physical control parameter illustrated in FIGS. 10A and 10B based on it being mapped, in database 150, to authorization parameters and/or a user of a valid authorization determined by authorization system 110. As also described herein, in some implementations the physical control parameter illustrated in FIGS. 10A and 10B may be implemented based on input (e.g., a verbal command) provided by an active user via one or more user interface input devices incorporated as part of the robot 190 and/or otherwise associated with the robot 190.

A hand 101 of the user is illustrated in FIGS. 10A and 10B. In FIG. 10A, the user's hand 101 is contacting the end effector 196. FIG. 10A is prior to the user's hand 101 applying force, indicated by arrow 1002A in FIG. 10A, where the force would normally cause one or more of the operational components 194*d-h* to undergo movement. As indicated by arrow 1002B of FIG. 10B, in FIG. 10B the user's hand 101 has applied such force. Notably, in FIG. 10B the joint 194*c* has rotated. However, one or more of the operational components 194*d-h* that would normally undergo movement in response to application of such a force have not moved due to being locked by the robot 190. One or more processors of the robot 190 may apply various techniques to lock degrees of freedom of the robot.

Although particular examples of physical control parameters are illustrated in FIGS. 9A-10B, additional and or alternative physical control parameters may be implemented, optionally in combination with one another. For example, although FIGS. 9A and 9B illustrate a complete restriction of the position and orientation of the end effector 196, in other implementations the movement of the end effector 196 may only be partially restricted. For example, the end effector 196 may be restricted such that it is only allowed to move in a single plane (e.g., a horizontal plane).

Figure 11:
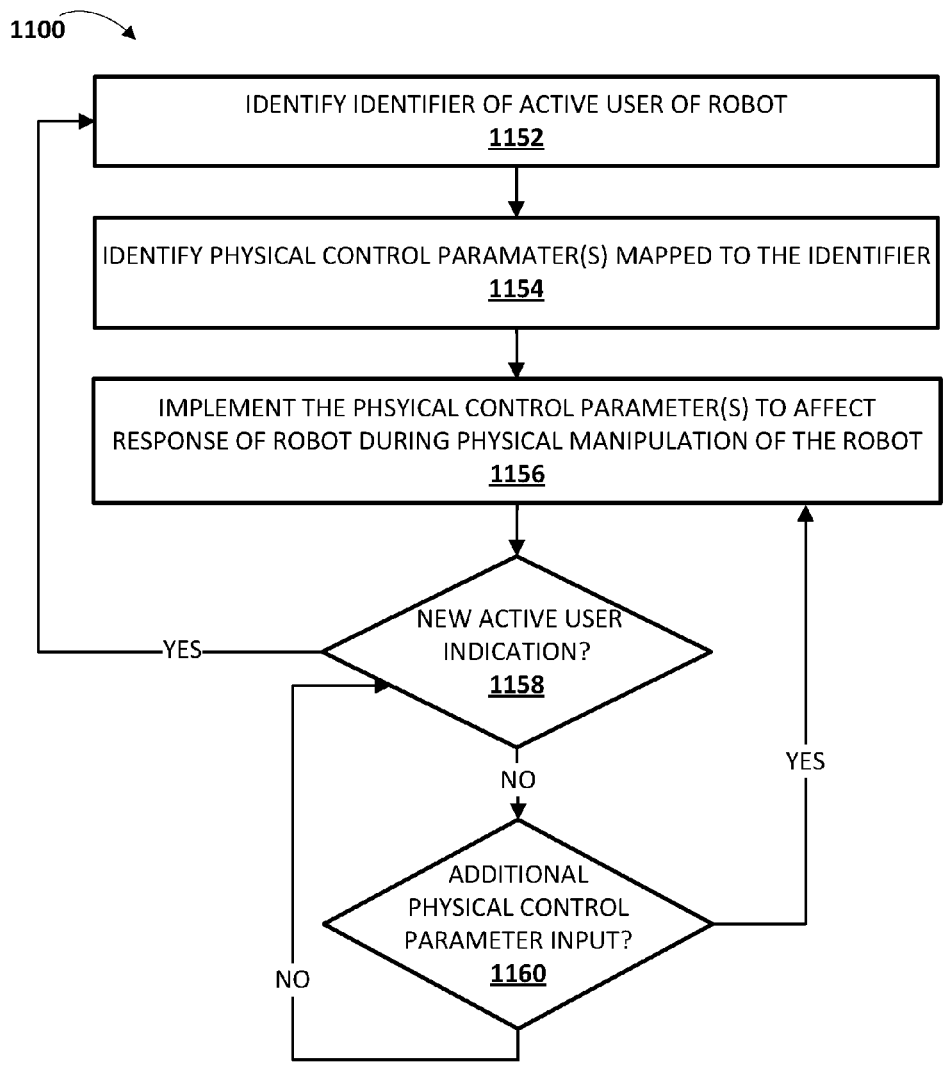
FIG. 11 is a flowchart illustrating an example method of adapting one or more physical control parameters for a robot based on preferences of a user.

FIG. 11 is a flowchart illustrating an example method 1100 of adapting one or more physical control parameters for a robot based on preferences of a user. For convenience, the operations of the flow chart are described with reference to a system that performs the operations. This system may include various components of various computer systems, such as robot functions determination engine 122 and robot functions activation engine 124 of FIG. 1. Moreover, while operations of method 1100 are shown in a particular order, this is not meant to be limiting. One or more operations may be reordered, omitted or added.

At block 1152, the system identifies an identifier of an active user of a robot. In some implementations, the identifier includes authorization parameters for an authorization of the robot or is mapped to the authorization parameters. For example, the identifier may include or be identified based on authorization parameters associated with an authorization based on physical manipulation of a robot (e.g., as described in method 700). As another example, the identifier may include or be identified based on authorization parameters associated with a biometric authorization of the robot.

At block 1154, the system identifies one or more physical control parameters mapped to the identifier. For example, the physical control parameters may be directly or indirectly mapped to the identifier in one or more non-transitory computer readable media. The physical control parameters may include, for example, impedance of the robot, the "locking" of one or more degrees of freedom of the robot, restricting the freedom of movement of one or more reference points of the robot (e.g., a reference point of the end effector), etc.

At block 1156, the system implements the physical control parameters to affect response of the robot during physical manipulation of the robot. For example, to implement the physical control parameters the system may provide one or more control commands to one or more actuators or other operational components of the robot. For instance, the physical control parameters may include mechanical impedance parameter(s) that affect the "resistance" of the robot in response to physical manipulation of the robot by a user. The mechanical impedance parameters may be implemented by the system by adjusting values associated with actuators of the robot to achieve a desired mechanical impedance.

At block 1158, the system determines whether a new active user indication has been received. For example, the system may determine whether a new active user indication has been received as a result of a new user being authenticated for the robot. If the system determines a new active user indication has been received, the system returns to block 1152 and identifies a new identifier of the new active user.

If the system determines that a new active user indication has not been received, the system proceeds to block 1160 and determines if additional physical control parameter input has been received. If the system determines additional physical control parameter input has not been received, the system returns to block 1158.

If the system determines additional physical control parameter input has been received, the system returns to block 1156 where new physical control parameters are implemented that correspond to the additional physical control parameter input. For example, the additional physical control parameter input may be received via a microphone and/or other user interface input device and the system may determine new physical control parameters based on the input, and implement the physical control parameters at block 1156. For instance, the new physical control parameters may modify the physical control parameters previously implemented at block 1156 and/or may be in addition to the physical control parameters previously implemented at block 1156. As one specific example, the physical control parameters previously implemented at block 1156 may be mechanical impedance parameters and the new physical control parameters may lock one or more degrees of freedom of the robot.

Figure 12:
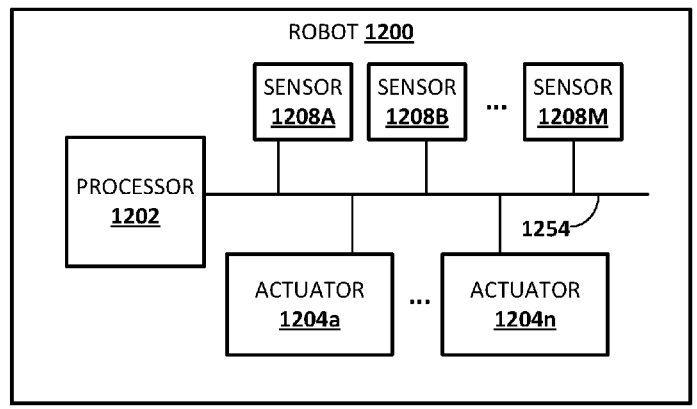
FIG. 12 schematically depicts an example architecture of a robot.

FIG. 12 schematically depicts an example architecture of a robot. Robot 1200 may take various forms, including but not limited to forms similar to robots 180 and 190 described above, telepresence robot, a humanoid form, an animal form, a wheeled device, a submersible vehicle, an unmanned aerial vehicle ("UAV"), and so forth. Robot 1200 includes at one processor 1202. Processor 1202 may take various forms, such as a central processing unit ("CPU"), a graphics processing unit ("GPU"), one or more field-programmable gate arrays ("FPGA"), one or more application-specific integrated circuits ("ASIC"), and/or one or more so-called "real time controllers."

In various implementations, processor 1202 may be operably coupled with one or more actuators 1204a-n and/or one or more sensors 1208a-m, e.g., via one or more buses 1254. Sensors 1208a-m may take various forms, including but not limited to three-dimensional vision devices, two-dimensional vision devices, light sensors, pressure sensors, pressure wave sensors (e.g., microphones), motion sensors, proximity sensors, accelerometers, gyroscopes, thermometers, barometers, and so forth. While sensors 1208a-m are depicted as being integral with robot 1200, this is not meant to be limiting. In some implementations, one or more sensors 1208a-m may be located external to robot 1200, e.g., as standalone units.

Processor 1202 may provide control commands to the actuators 1204a-n and/or the sensors 1208a-m to accomplish one or more tasks such as grasping objects, lifting objects, moving objects, navigating near objects, climbing stairs (e.g., when the robot 1200 is a humanoid robot), etc. Actuators 1204a-n may include, for example, one or more end effectors and/or one or more servo motors or other actuators to effectuate movement of one or more components of the robot. For example, the robot 1200 may have multiple degrees of freedom and each of the actuators 1204a-n may control actuation of the robot 1200 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

Processor 1202 may further provide control commands to the actuators 1204a-n to enable the robot 1200 to be in a gravity-compensated mode during all or portions of physical manipulations of the robot 1200 by the user as described herein. Moreover, the processor 1202 may optionally determine positions and/or other parameters of one or more actuators 1204a-n based on sensor feedback and/or other techniques and provide indications of the positions and/or other parameters for utilization in authorization related techniques described herein. Moreover, the processor 1202 may optionally determine authorization parameters, determine valid authorizations, and/or adapt one or more functions of robot 1200 according to various techniques described herein. For example, the processor 1202 may execute instructions stored in one or more non-transitory computer readable media to cause the processor to perform selected aspects of methods 600, 700, and/or 1100; and/or to implement one or more aspects of engines 112, 114, 122, and/or 124.

Figure 13:
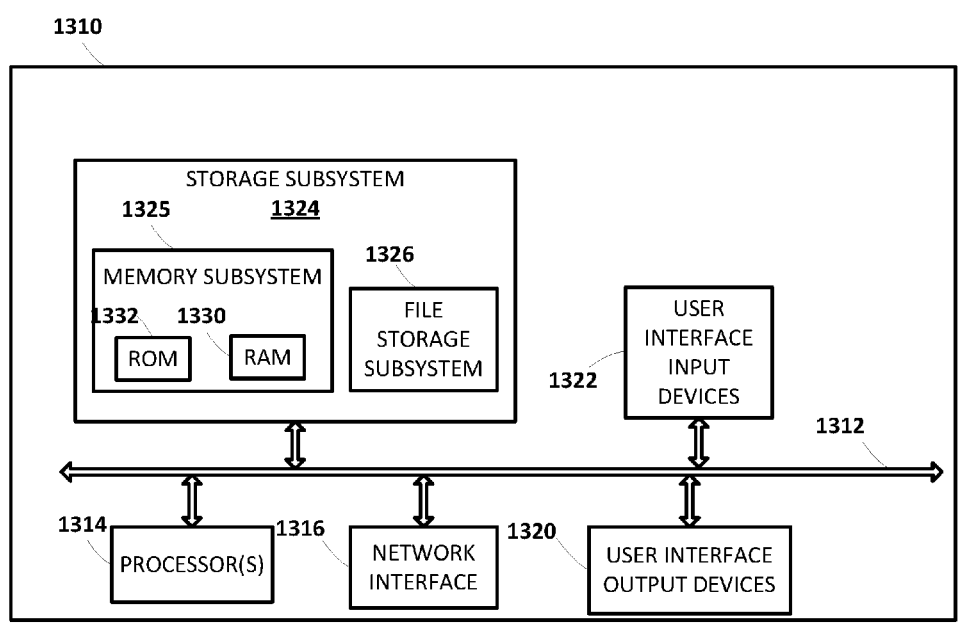
FIG. 13 schematically depicts an example architecture of a computer system.

FIG. 13 is a block diagram of an example computer system 1310. Computer system 1310 typically includes at least one processor 1314 which communicates with a number of peripheral devices via bus subsystem 1312. These peripheral devices may include a storage subsystem 1324, including, for example, a memory subsystem 1325 and a file storage subsystem 1326, user interface output devices 1320, user interface input devices 1322, and a network interface subsystem 1316. The input and output devices allow user interaction with computer system 1310. Network interface subsystem 1316 provides an interface to outside networks and is coupled to corresponding interface devices in other computer systems.

User interface input devices 1322 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 1310 or onto a communication network.

User interface output devices 1320 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1310 to the user or to another machine or computer system.

Storage subsystem 1324 stores programming and data constructs that provide the functionality of some or all of the modules described herein. For example, the storage subsystem 1324 may include the logic to perform selected aspects of methods 600, 700, and/or 1100; and/or to implement one or more aspects of engines 112, 114, 122, and/or 124. Memory 1325 used in the storage subsystem 1324 can include a number of memories including a main random access memory (RAM) 1330 for storage of instructions and data during program execution and a read only memory (ROM) 1332 in which fixed instructions are stored. A file storage subsystem 1326 can provide persistent storage for program and data files, and may include a hard disk drive, a CD-ROM drive, an optical drive, or removable media cartridges. Modules implementing the functionality of certain implementations may be stored by file storage subsystem 1326 in the storage subsystem 1324, or in other machines accessible by the processor(s) 1314.

Bus subsystem 1312 provides a mechanism for letting the various components and subsystems of computer system 1310 communicate with each other as intended. Although bus subsystem 1312 is shown schematically as a single bus, alternative implementations of the bus subsystem may use multiple busses.

Computer system 1310 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 1310 depicted in FIG. 13 is intended only as a specific example for purposes of illustrating some implementations. Many other configurations of computer system 1310 are possible having more or fewer components than the computer system depicted in FIG. 13.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors associated with a robot, comprising:
   identifying, by one or more of the processors, sensor data generated by one or more sensors of the robot, wherein the sensor data is generated when at least one function of the robot is inactive, and wherein the sensor data is generated in response to physical manipulation of the robot by a user that causes one or more components of the robot to traverse to a plurality of positions;
   comparing, by one or more of the processors, authorization parameters for an authorization of the robot to the sensor data or to values generated based on the sensor data;
   determining, by one or more of the processors based on the comparing, that the authorization parameters conform to the sensor data or to the values generated based on the sensor data; and
   activating, by one or more of the processors, the at least one function of the robot based on determining that the authorization parameters conform to the sensor data or to the values generated based on the sensor data.

2. The method of claim 1, wherein the at least one function of the robot is a training mode of the robot.

3. The method of claim 1, wherein the at least one function of the robot includes at least one function that is particular to the user and further comprising:
   identifying, by one or more of the processors, that the authorization parameters are mapped to the at least one function in one or more computer readable media;
   wherein activating the at least one function of the robot comprises activating the at least one function based on identifying the authorization parameters are mapped to the at least one function.

4. The method of claim 3, wherein identifying that the authorization parameters are mapped to the at least one function comprises:
   identifying a first mapping between the authorization parameters and an identifier of the user; and identifying a second mapping between the identifier of the user and the at least one function.

5. The method of claim 3, wherein the at least one function is a mechanical impedance setting for at least some of the components of the robot.

6. The method of claim 1, further comprising:
generating, by one or more of the processors based on the sensor data, manipulation position values that define positions traversed by an end effector in response to the physical manipulation of the robot by the user;
wherein comparing the authorization parameters for the authorization of the robot to the sensor data or to the values generated based on the sensor data comprises: comparing authorization position values to the manipulation position values.

7. The method of claim 6, wherein the sensor data comprises position values for a plurality of joints of the robot that control positioning of the end effector and wherein generating the manipulation position values comprises applying the position values to a forward kinematic model of the robot to generate the manipulation position values.

8. The method of claim 1, further comprising:
identifying, by one or more of the processors, an initiation of authorization of the robot; and
applying, by one or more of the processors and based on identifying the initiation of authorization, manipulation constraints during the physical manipulation of the robot by the user.

9. The method of claim 8, wherein the manipulation constraints restrict movement of a reference point of an end effector of the robot to one or more planar segments.

10. The method of claim 8, wherein the manipulation constraints restrict movement of a reference point of an end effector of the robot to movements between a defined subset of positions.

11. The method of claim 1, wherein identifying the sensor data further comprises selecting the sensor data based on user interface input being received before or during generation of the sensor data.

12. A method implemented by one or more processors associated with a robot, comprising:
identifying, by one or more of the processors, an identifier of an active user of the robot based on interaction by the user with the robot;
identifying, by one or more of the processors, one or more physical control parameters mapped to the identifier in one or more computer readable media, wherein the physical control parameters affect the response of one or more operational components of the robot when the robot is physically manipulated by the user; and
implementing, by one or more of the processors, the physical control parameters to affect the response of the operational components of the robot during physical manipulation of the robot by the user.

13. The method of claim 12, further comprising:
receiving, by one or more of the processors, user interface input indicating additional physical control parameters that further affect the response of one or more of the operational components of the robot; and
implementing, by one or more of the processors, the additional physical control parameters.

14. The method of claim 13, wherein the physical control parameters affect a mechanical impedance of the robot.

15. The method of claim 14, wherein the additional physical control parameters lock one or more degrees of freedom of the robot.

16. The method of claim 14, wherein the additional physical control parameters restrict movement of an end effector of the robot along one or more axes.

17. The method of claim 12, wherein identifying the identifier of the active user of the robot based on interaction by the user with the robot comprises:
identifying sensor data generated by one or more sensors of the robot, wherein the sensor data is generated in response to physical manipulation of the robot by the user;
comparing authorization parameters for the user to the sensor data or to values generated based on the sensor data;
determining, based on the comparing, that the authorization parameters conform to the sensor data or to the values generated based on the sensor data;
wherein the identifier of the active user is the authorization parameters or is mapped to the authorization parameters; and
wherein the identifier of the active user is identified based on determining that the authorization parameters conform to the sensor data or to the values generated based on the sensor data.

18. The method of claim 12, wherein identifying the identifier of the active user of the robot based on interaction by the user with the robot comprises:
identifying sensor data generated by a fingerprint sensor of the robot, wherein the sensor data is generated in response to the user contacting the fingerprint sensor;
comparing authorization parameters for the user to the sensor data or to values generated based on the sensor data;
determining, based on the comparing, that the authorization parameters conform to the sensor data or to the values generated based on the sensor data;
wherein the identifier of the active user is the authorization parameters or is mapped to the authorization parameters; and
wherein the identifier of the active user is identified based on determining that the authorization parameters conform to the sensor data or to the values generated based on the sensor data.

19. A system comprising:
one or more operational components of a robot that are physically manipulable by a user;
one or more processors receiving sensor data generated by one or more sensors of the robot, wherein the sensor data is generated when at least one function of the robot is inactive, and wherein the sensor data is generated in response to physical manipulation of a plurality of the operational components of the robot by the user, wherein the one or more processors are configured to:
compare authorization parameters for an authorization of the robot to the sensor data or to values generated based on the sensor data;
determine, based on the comparing, that the authorization parameters conform to the sensor data or to the values generated based on the sensor data; and
activate the at least one function of the robot based on determining that the authorization parameters conform to the sensor data or to the values generated based on the sensor data.

* * * * *